(12) United States Patent
Gonska et al.

(10) Patent No.: US 7,931,061 B2
(45) Date of Patent: Apr. 26, 2011

(54) TIRE INFLATION SYSTEM WITH INTEGRATED WHEEL SEAL

(75) Inventors: David Gregory Gonska, Beverly Hills, MI (US); Tracy Gerard Ellis, Whitelake, MI (US); Yenkai Brian Wang, Rochester Hills, MI (US); Steven Ray Miller, Clarkston, MI (US); Jeremy Tertzakian, Chesterfield Township, MI (US); Scott Arthur Jenkinson, Davisburg, MI (US); John David Morgan, Medina, OH (US); Norman Austin, Kutztown, PA (US); Christopher J. Wittry, Georgetown, KY (US); Richard L Decaire, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 129 days.

(21) Appl. No.: 12/334,734

(22) Filed: Dec. 15, 2008

(65) Prior Publication Data

US 2010/0147429 A1 Jun. 17, 2010

(51) Int. Cl.
*B60C 23/00* (2006.01)
(52) U.S. Cl. .................................................. 152/417
(58) Field of Classification Search .................. 152/415, 152/416, 417
See application file for complete search history.

(56) References Cited

U.S. PATENT DOCUMENTS

| | | | | |
|---|---|---|---|---|
| 1,827,662 A | * | 10/1931 | Maas | 152/416 |
| 2,944,579 A | | 7/1960 | Kamm et al. | |
| 2,976,906 A | * | 3/1961 | Kamm et al. | 152/417 |
| 4,418,737 A | | 12/1983 | Goodell | |
| 4,431,043 A | | 2/1984 | Goodell et al. | |
| 4,498,515 A | * | 2/1985 | Holtzhauser et al. | 152/417 |
| 4,705,090 A | | 11/1987 | Bartos | |
| 4,733,707 A | * | 3/1988 | Goodell et al. | 152/417 |
| 4,754,792 A | * | 7/1988 | Braun et al. | 152/417 |
| 4,804,027 A | * | 2/1989 | Runels | 152/417 |
| 4,892,128 A | * | 1/1990 | Bartos | 152/417 |
| 5,080,157 A | | 1/1992 | Oerter | |
| 5,253,688 A | * | 10/1993 | Tigges | 152/417 |
| 5,354,391 A | | 10/1994 | Goodell et al. | |
| 5,587,698 A | * | 12/1996 | Genna | 340/442 |
| 6,145,558 A | * | 11/2000 | Schmitz | 152/416 |
| 6,668,888 B1 | | 12/2003 | Beesley | |
| 7,051,777 B2 | | 5/2006 | Tarasinski | |
| 7,207,365 B2 | | 4/2007 | Nelson | |

FOREIGN PATENT DOCUMENTS

EP 410723 A1 * 1/1991

OTHER PUBLICATIONS

European Search Report dated Aug. 23, 2010.

\* cited by examiner

*Primary Examiner* — Russell D Stormer
(74) *Attorney, Agent, or Firm* — Carlson, Gaskey & Olds

(57) ABSTRACT

An axle assembly includes a non-rotating component and a wheel hub supported for rotation relative to the non-rotating component about an axis. The wheel hub includes a hub air passage that has a hub inlet and a hub outlet to be fluidly connected to at least one tire. An air chamber is formed at least in part between the non-rotating component and the wheel hub. The air chamber receives air flow from an air source and directs air flow into the hub inlet. A seal assembly engages the wheel hub to seal the air chamber.

15 Claims, 2 Drawing Sheets

TIRE INFLATION SYSTEM WITH INTEGRATED WHEEL SEAL

TECHNICAL FIELD

The subject invention relates to an axle that includes an air passage that forms part of a tire inflation system. More specifically, the air passage is formed at least in part between a rotating wheel hub and a non-rotating component, and is sealed by an integrated seal assembly.

BACKGROUND OF THE INVENTION

Tire inflation systems are used on vehicles, such as tractor-trailer vehicles for example, to maintain tire inflation pressures at a desired tire pressure setting. The tire inflation system draws pressurized air from on-board air tanks and supplies this air to an under-inflated tire when tire pressure falls below the desired tire pressure setting.

Drive axles present challenges for routing air from the air tanks to the tires. Typically, air hoses must be routed externally of the axle components and around the outside of the tires. Such a routing configuration takes up a significant amount of packaging space that could otherwise be used for other vehicle components. Further, due to the external mounting, a significant portion of the air hoses is exposed to potentially damaging contact from rocks, debris, etc.

SUMMARY OF THE INVENTION

An axle assembly includes an air passage for fluid communication with a tire inflation system. The axle assembly includes a non-rotating component and a wheel hub supported for rotation relative to the non-rotating component about an axis. The air passage is formed at least in part between the wheel hub and the non-rotating component, and is sealed with a seal assembly.

In one example, the wheel hub includes a hub air passage that has a hub inlet and a hub outlet to be fluidly connected to at least one tire. The non-rotating component comprises a spindle that rotatably supports the wheel hub. An air chamber is formed at least in part between the spindle and the wheel hub. The air chamber receives air flow from an air source and directs air flow into the hub inlet. A seal assembly engages the wheel hub to seal the air chamber.

In one example, the seal assembly includes first and second seals that are in sealing engagement with the wheel hub and the non-rotating component.

In another example, the seal assembly comprises a cartridge seal with seal portions that are in contact with the wheel hub and the non-rotating component. The seal portions engage each other, and the air chamber is formed between the seal portions.

In one example, the non-rotating component comprises a spindle that rotatably supports the wheel hub and the air chamber is defined in part by a manifold that is fixed to the spindle. The manifold includes a first passage to direct air from an air source to the air chamber. The seal assembly seals against an inner surface of the wheel hub and an outer surface of the manifold to form the air chamber. The manifold also includes a second passage to direct lubricating fluid to the seals.

In another example, the non-rotating component comprises an annular ring that surrounds an inboard end of the wheel hub. The air chamber is defined within the annular ring at the inboard end of the wheel hub. The seal assembly includes a first seal that engages the annular ring and an outer peripheral surface of the wheel hub and a second seal that engages the annular ring and an inner peripheral surface of the wheel hub to define the air chamber.

In one example, the axle assembly is a drive axle and includes an axle shaft that is driven by a power source. The axle shaft is coupled to drive the wheel hub about an axis of rotation relative to the spindle.

These and other features of the present invention can be best understood from the following specification and drawings, the following of which is a brief description.

DETAILED DESCRIPTION OF THE PREFERRED EMBODIMENT

Figure 1:
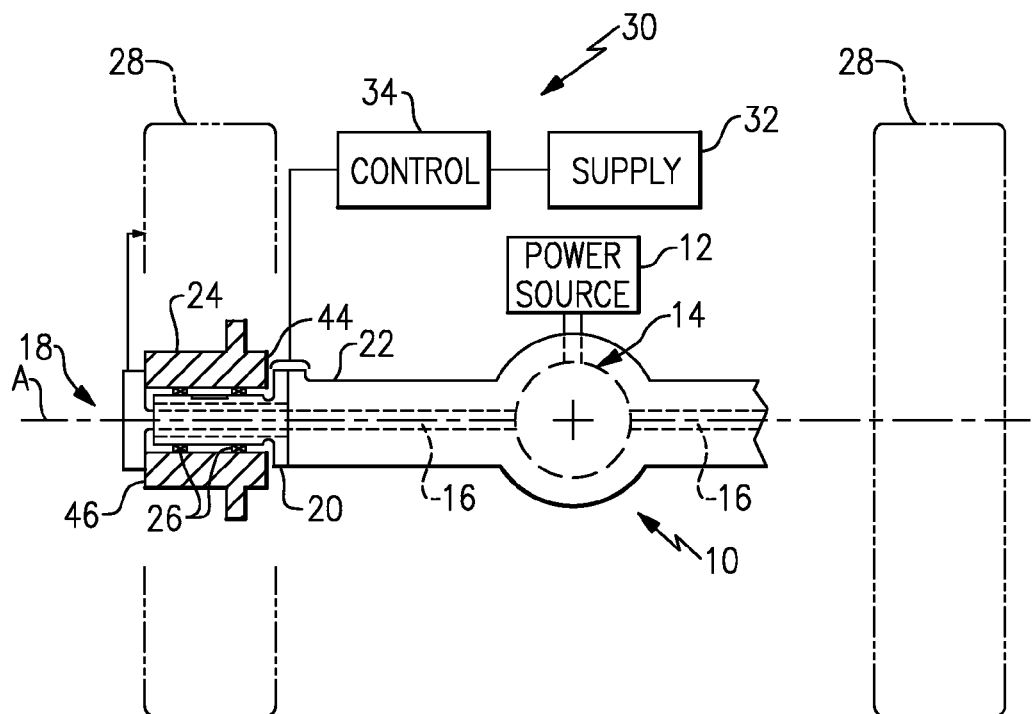
FIG. 1 is a schematic representation of a drive axle assembly in fluid communication with a tire inflation system.

FIG. 1 shows a drive axle 10 receiving driving input from a power source 12, such as an engine or electric motor for example. The driving input drives an input gear assembly 14 that includes a differential mechanism as known. The gear assembly 14 drives axle shafts 16 that are coupled to drive wheel end assemblies 18. One example of a wheel end assembly 18 is shown to the left of FIG. 1. It should be understood that the opposite wheel end assembly 18 would be similarly configured.

The wheel end assembly 18 includes a non-rotating spindle 20 that is mounted to an axle housing 22. The axle housing 22 houses the gear assembly 14 and axle shafts 16. A wheel hub 24 is rotatably supported on the spindle 20 by bearings 26. A tire 28 and associated rim are mounted for rotation with the wheel hub 24 about an axis A.

A tire inflation system 30 includes an air supply reservoir or tank 32 that is used to supply air to the tires 28 when the tires 28 become under-inflated. The tire inflation system 30 includes a control 34 that determines when air is to be supplied and also controls the amount of air supplied as known. The control 34 can be automatically activated via an electronic control unit or other similar device to control the amount of air supplied, or the control 34 can be manually actuated by a vehicle operator. The control 34 can include various valves, sensors, pressure regulators, etc. as known to control distribution of the air from the tank 32. The control 34 is also configured to stop supplying air to a tire if pressure falls below a certain level to prevent the tank 32 from being depleted of air, such as when a tire has experienced a blow-out for example.

Figure 2:
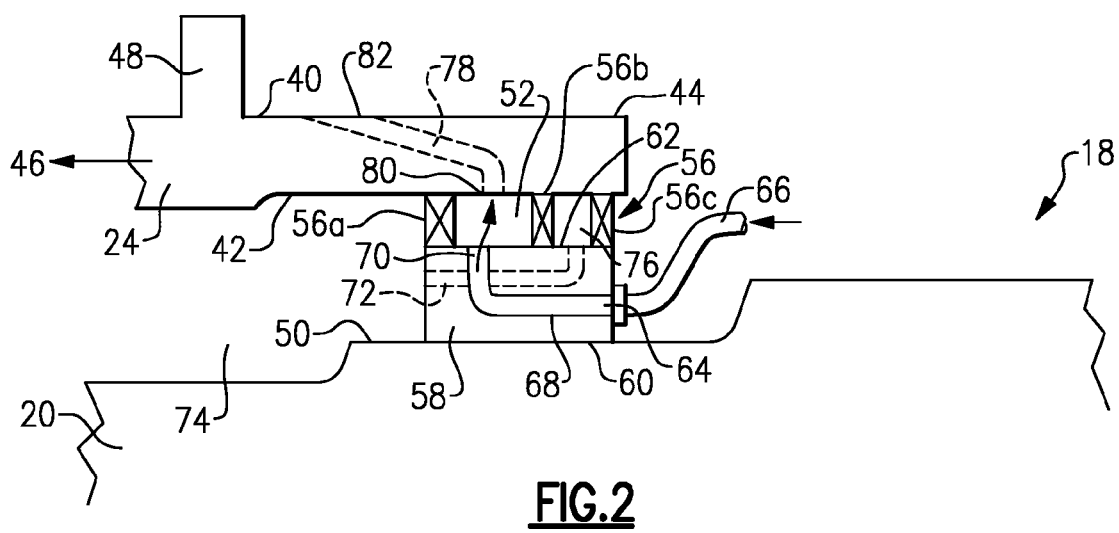
FIG. 2 is one example of an air passage formed between a spindle and a wheel hub.

The control 34 supplies air to the wheel end assembly 18 which includes passages that convey the air to the tire 28. FIG. 2 shows one example of a wheel end assembly 18 as used with the tire inflation system 30. The wheel hub 24 includes an outer peripheral surface 40 and an inner peripheral surface 42 that surround the axis of rotation A. The wheel hub 24 also includes an inboard end 44 and an outboard end 46 with a mounting flange portion 48 that can be used to mount other brake or wheel structures.

An air chamber 52 is formed at least in part between the wheel hub 24 and a non-rotating component, such as the spindle 20 for example. As shown in FIG. 2, the spindle 20 includes an outer peripheral surface 50 that is spaced radially inwardly of the inner peripheral surface 42 of the wheel hub 24. The air chamber 52 is defined within a space formed between the wheel hub 24 and the spindle 20.

A seal assembly 56 is integrated into the wheel end assembly 18 to seal the air chamber 52. The seal assembly 56 directly seals against the inner peripheral surface 42 of the wheel hub 24.

In the example in FIG. 2, a manifold 58 is fixed to the outer peripheral surface 50 of the spindle 20. The manifold 58 includes an inner peripheral surface 60 that is seated against the spindle 20 and an outer peripheral surface 62 that is spaced radially inwardly relative to the inner peripheral surface 42 of the wheel hub 24 to define the air chamber 52. The manifold 58 and seal assembly 56 are positioned at the inboard end 44 of the wheel hub 24 such that the air chamber 52 is inboard of the wheel bearings 26.

The manifold 58 includes an inlet port 64 that is connected to the air tank 32 with a conduit or hose 66. The manifold includes a first passage 68 that that directs air from the inlet port 64 to the air chamber 52.

The seal assembly 56 includes at least a first seal 56a and a second seal 56b that is axially spaced from the first seal 56a along the axis A. The first 56a and second 56b seals both directly engage the inner peripheral surface 42 of the wheel hub 24 and the outer peripheral surface 62 of the manifold 58.

The manifold 58 includes an outlet port 70 that empties into the air chamber 52 at a position between the first 56a and second 56b seals. The manifold 58 also includes a second passage 72 that directs lubricating fluid to the seal assembly 56. The second passage 72 extends from a lubrication cavity 74 formed between the inboard bearing 26 (FIG. 1) and the first seal 56a to a lubrication cavity 76 that is positioned inboard of the second seal 56b. A third seal 56c sealingly engages the inner peripheral surface 42 of the wheel hub 24 and the outer peripheral surface 62 of the manifold to seal the lubrication cavity 76. This prevents lubricating fluid from exiting the wheel end assembly 18 at the inboard end 44 of the wheel hub 24.

Air enters the manifold 58 through the inlet port 64 and exits into the air chamber 52. Air then enters a hub passage 78 that is formed within the wheel hub 24. The hub passage 78 can be formed through the hub body, hub flange portion 48, through a wheel stud hole, etc. The hub passage 78 includes a hub inlet 80 and a hub outlet 82 that is fluidly connected to at least one of the tires 28.

Figure 3:
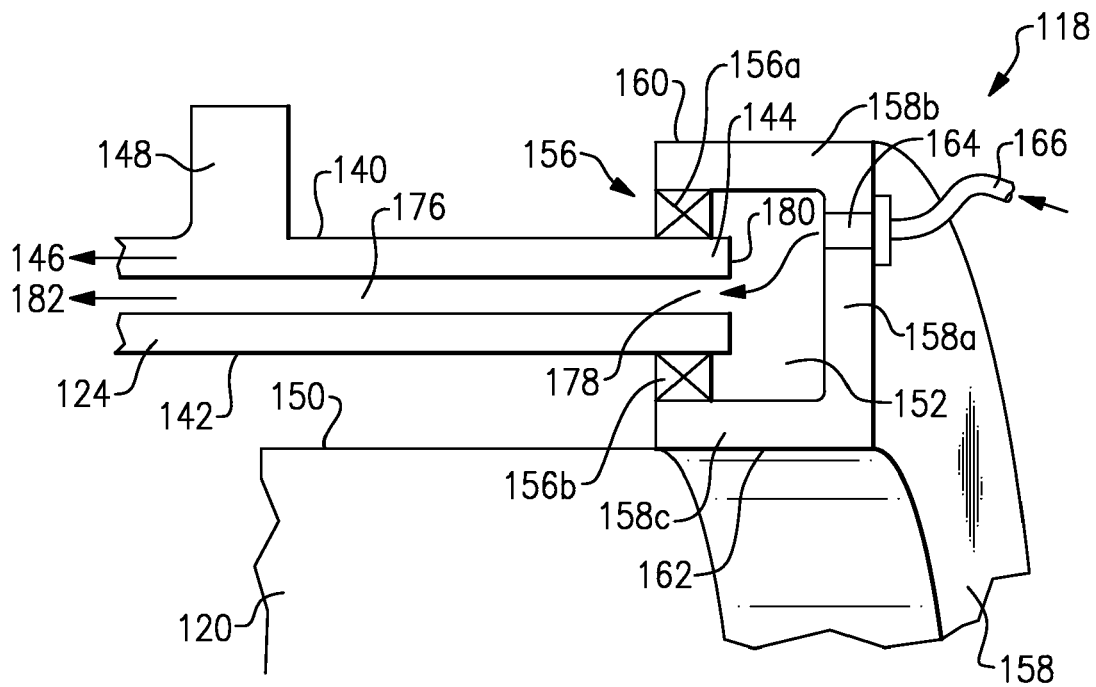
FIG. 3 is another example of an air passage formed between a spindle and a wheel hub.

FIG. 3 shows another example of a wheel end assembly 118 as used with the tire inflation system 30. A wheel hub 124 includes an outer peripheral surface 140 and an inner peripheral surface 142 that surround the axis of rotation A. The wheel hub 124 also includes an inboard end 144 and an outboard end 146 with a mounting flange portion 148.

The spindle 120 includes an outer peripheral surface 150 that is spaced radially inwardly of the inner peripheral surface 142 of the wheel hub 124. A seal assembly 156 is integrated into the wheel end assembly 118 to seal an air chamber 152. The seal assembly 156 directly seals against the inner peripheral surface 142 of the wheel hub 124.

In the example of FIG. 3, the non-rotating component comprises an annular ring 158 is positioned to surround the inboard end 144 of the wheel hub 124 at a position where an ABS tone ring would typically be mounted. The annular ring 158 is a stationary, i.e. non-rotating component, which can be fixed to the spindle 120 or to another non-rotating axle or brake component. The annular ring 158 has a C-shape cross-section with a vertical wall portion 158a and first 158b and second 158c lateral flange portions that extend axially away from opposing ends of the vertical wall portion 158a.

The first 158b and second 158c lateral flange portions extend in a direction that is generally parallel to the axis A. The first lateral flange portion 158b defines an outer peripheral surface 160 of the annular ring 158 and the second lateral flange portion 158c defines an inner peripheral surface 162 of the annular ring 158. The first 158b and second 158c flange portions are positioned in an overlapping relationship with the inboard end 144 of the wheel hub 124. The first lateral flange portion 158b is positioned radially outwardly of the outer peripheral surface 140 of the wheel hub 124 and the second lateral flange portion 158c is positioned radially inwardly of the inner peripheral surface 142 of the wheel hub 124. The air chamber 152 is formed within the annular ring 158 at the inboard end 144 of the wheel hub 124 at a position that is between the first 158b and second 158c lateral flange portions.

The vertical wall portion 158a includes an inlet port 164 that is fluidly connected to the air tank 32 with a conduit or hose 166. The port 164 directs air into the air chamber 152.

The wheel hub 124 includes a hub passage 176 that is formed within a body of the hub between the inner 142 and outer 140 peripheral surfaces. The hub passage 176 includes a hub inlet 178 that is formed in an inboard end face 180 of the wheel hub 124. A portion of the hub passage 176 extends in a direction that is generally parallel to the axis A to a hub outlet 182 that is to be fluidly connected to at least one of the tires 28.

The seal assembly 156 includes a first seal 156a and a second seal 156b that is spaced radially inwardly from the first seal 156a. The first seal 156a is sealingly engaged between an inner surface of the first lateral flange portion 158b and the outer peripheral surface 140 of the wheel hub 124. The second seal 156b is sealingly engaged between an inner surface of the second lateral flange portion 158c and the inner peripheral surface 142 of the wheel hub 124. The first 156a and second 156b seals allow the wheel hub 124 to rotate and maintain the air chamber 152. Air is directed through the annular ring 158, into the air chamber 152, into the hub passage 176, and then exits to the tire 28. The hub passage 176 can extend through the hub body, hub flange, wheel mount hole, etc., as described above.

Figure 4:
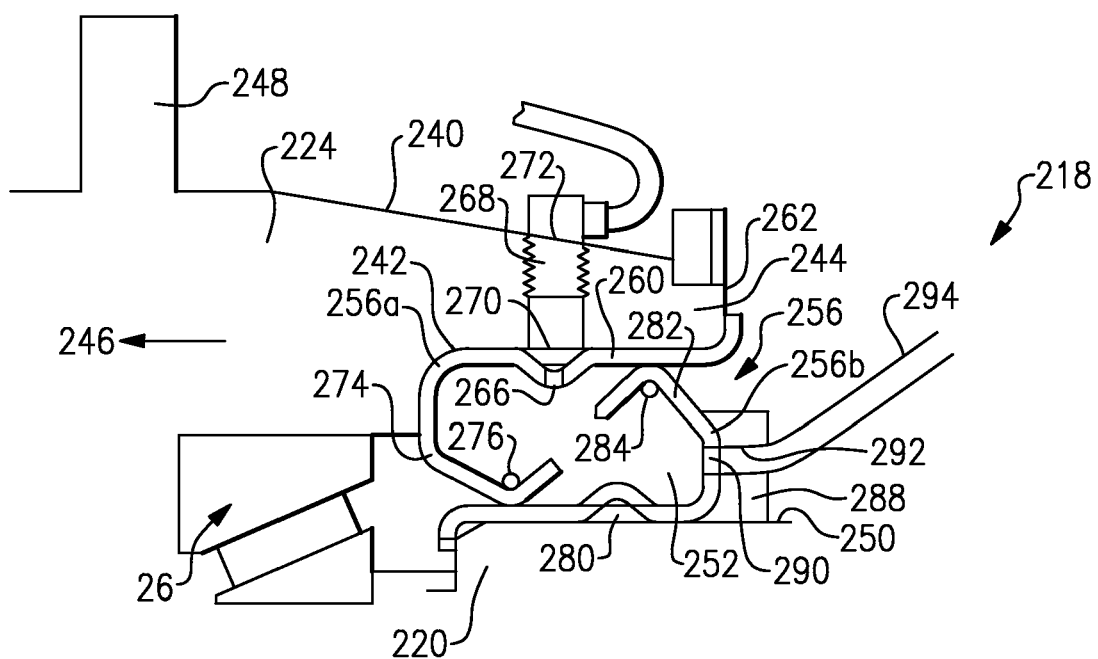
FIG. 4 is another example of an air passage formed between a spindle and a wheel hub.

FIG. 4 shows another example of a wheel end assembly 218 as used with the tire inflation system 30. A wheel hub 224 includes an outer peripheral surface 240 and an inner peripheral surface 242 that surround the axis of rotation A. The wheel hub 224 also includes an inboard end 244 and an outboard end 246 with a mounting flange portion 248.

The spindle 220 includes an outer peripheral surface 250 that is spaced radially inwardly of the inner peripheral surface 242 of the wheel hub 224. An air chamber 252 is defined, at least in part, within a space formed between the wheel hub 224 and the spindle 220.

A seal assembly 256 is integrated into the wheel end assembly 218 to seal the air chamber 252. The seal assembly 256 directly seals against the inner peripheral surface 142 of the wheel hub 124 and against the outer peripheral surface 250 of the spindle 220.

In the example of FIG. 4, the seal assembly 256 includes a first seal 256a and a second seal 256b; however, the seal assembly 256 could also comprise a cartridge seal formed as a single unit with first and second seal portions that respectively correspond to the first 256a and second 256b seals described below. The seal assembly 256 is positioned at the inboard end 244 of the wheel hub 224 at a position that is inboard of both wheel bearings 26.

The first seal 256a is fixed for rotation with the wheel hub 224 and the second seal 256b is fixed to the spindle 220. The first seal 256a includes a first portion 260 that seats against the inner peripheral surface 242 of the wheel hub 224. An opening 266 is formed within the first portion 260 and is in fluid communication with a hub passage 268 formed within the wheel hub 224. The hub passage 268 includes a hub inlet 270 at the air chamber 252 and a hub outlet 272 that is fluidly connected to the tire 28.

The first seal 256a includes a second portion 274 that extends transversely to the first portion 260 to contact the second seal 256b. A spring or other resilient retaining mechanism 276 biases the second portion 274 against the second seal 256b.

The second seal 256b includes a first portion 280 that seats against the outer peripheral surface 250 of the spindle 220. The second seal 256b includes a second portion 282 that that extends transversely to the first portion 280 to contact the first seal 256a. A spring or other resilient retaining mechanism 284 biases the second portion 282 against the first seal 256a.

The second portion 282 is seated against a flange 288 of the spindle 220 and includes an opening 290 that is in fluid communication with a port 292 formed in the flange 288. The port 292 is in fluid communication with the air supply via a conduit or hose connection 294.

Each of the wheel end assemblies set forth above provide a simple and effective fluid connection for directing air from a supply, through a drive axle, and to an associated tire. Further, these configurations reduce the number and length of hoses that are routed externally of the drive axle to provide a more robust system.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An axle assembly comprising:
   a non-rotating spindle including an outer peripheral surface;
   a wheel hub supported for rotation relative to said non-rotating spindle about an axis, said wheel hub including a hub air passage having a hub inlet and a hub outlet to be fluidly connected to at least one tire;
   at least one wheel bearing that rotatably supports said wheel hub for rotation relative to said non-rotating spindle;
   an air chamber formed at least in part between said non-rotating spindle and said wheel hub, said air chamber to receive air flow from an air source and directing air flow into said hub inlet of said hub air passage, and wherein said wheel hub includes an inboard end that extends circumferentially around said non-rotating spindle with said air chamber being formed at said inboard end at a position that is inboard of said at least one wheel bearing, and wherein said wheel hub includes an inner peripheral surface that is spaced radially outwardly relative to said outer peripheral surface of said non-rotating spindle, and wherein at least a portion of said air chamber is formed between said inner and said outer peripheral surfaces;
   a manifold that is fixed to said outer peripheral surface of said non-rotating spindle, said manifold including a first port to receive air flow from the air source and a first passage that directs air flow through said manifold to said air chamber, and wherein said air chamber is formed between an outer surface of said manifold and said inner peripheral surface of said wheel hub; and
   a seal assembly engaging said wheel hub to seal said air chamber, wherein said seal assembly includes at least first and second seals that are mounted between said inner peripheral surface and said outer surface of said manifold, and which are axially spaced apart from each other along said axis to define said air chamber, and wherein said manifold includes a second passage that directs lubricating fluid to a location inboard of said first and said second seals that define said air chamber.

2. The axle assembly according to claim 1 including a third seal positioned inboard of said first and second seals to define a lubrication chamber between said third seal and one of said first and said second seals.

3. The axle assembly according to claim 1 wherein said hub inlet is positioned axially between said first and said second seals.

4. The axle assembly according to claim 1 including an axle shaft receiving driving input from a power source, said axle shaft being coupled to drive said wheel hub about said axis of rotation.

5. The axle assembly according to claim 1 including a first lubrication cavity formed between said at least one wheel bearing and said first seal and a second lubrication cavity positioned inboard of said first and second seal, said second passage connecting said first and second lubrication cavities.

6. The axle assembly according to claim 5 including a third seal positioned inboard of said second seal, said second lubrication cavity being formed between said second and said third seals.

7. An axle assembly comprising:
   a non-rotating component;
   a wheel hub supported for rotation relative to said non-rotating component about an axis, said wheel hub including a hub air passage having a hub inlet and a hub outlet to be fluidly connected to at least one tire;
   an air chamber formed at least in part between said non-rotating component and said wheel hub, said air chamber to receive air flow from an air source and directing air flow into said hub inlet of said hub air passage;
   a manifold that is fixed to an outer peripheral surface of said non-rotating component, said manifold including a first port to receive air flow from the air source and a first passage that directs air flow from said first port and through said manifold to said air chamber;
   a seal assembly engaging said wheel hub and said manifold to seal said air chamber; and
   a first lubrication cavity positioned outboard of said seal assembly and a second lubrication cavity positioned inboard of said seal assembly chamber, wherein said manifold includes a second passage that fluidly connects said first and second lubrication cavities.

8. The axle assembly according to claim 7 wherein said non-rotating component comprises a spindle.

9. The axle assembly according to claim 7 wherein said seal assembly includes first and second seals that are axially spaced apart from each other to define said air chamber, said first and second seals directly engaging an outer surface of said manifold and an inner surface of said wheel hub.

10. The axle assembly according to claim 9 wherein said manifold includes a second port that is positioned between said first and second seals, said second port directing air from said first passage into said air chamber.

11. The axle assembly according to claim 9 including at least one wheel bearing that rotatably supports said wheel hub on said non-rotating component for rotation about said axis, and wherein said air chamber is positioned inboard of said at least one wheel bearing.

12. The axle assembly according to claim 11 wherein said second passage extends from said first lubrication cavity, which is formed between said at least one bearing and said first seal, to said second lubrication cavity that is positioned inboard of said second seal.

13. The axle assembly according to claim 12 including a third seal positioned inboard of said second seal such that said second lubrication cavity is formed between said second and said third seals.

14. The axle assembly according to claim 13 wherein said third seal directly engages said outer surface of said manifold and said inner surface of said wheel hub.

15. The axle assembly according to claim 9 wherein said hub inlet is positioned axially between said first and said second seals.

* * * * *